INVENTOR
JAMES R. KITTRELL
BY Roy H. Davies
C. J. Tonkin
ATTORNEYS

United States Patent Office 3,576,736
Patented Apr. 27, 1971

3,576,736
HYDROCRACKING CATALYST COMPRISING A CRYSTALLINE ZEOLITIC MOLECULAR SIEVE COMPONENT, A GROUP VIII COMPONENT AND GOLD, AND PROCESS USING SAID CATALYST
James R. Kittrell, El Cerrito, Calif., assignor to Chevron Research Company, San Francisco, Calif.
Filed June 17, 1969, Ser. No. 834,034
Int. Cl. C10g 13/02, 13/10
U.S. Cl. 208—60
15 Claims

ABSTRACT OF THE DISCLOSURE

A hydrocracking catalyst comprising a crystalline zeolitic molecular sieve cracking component, 0.01 to 2.0 weight percent, based on said cracking component and calculated as the metal, of a hydrogenating component selected from the metals platinum, palladium, rhodium, ruthenium, iridium, and compounds of said metals, and 0.01 to 5.0 weight percent, based on said cracking component and calculated as the metal, of a hydrogenating component selected from the group consisting of gold and compounds of gold, and processes using said catalyst.

Figure 1:
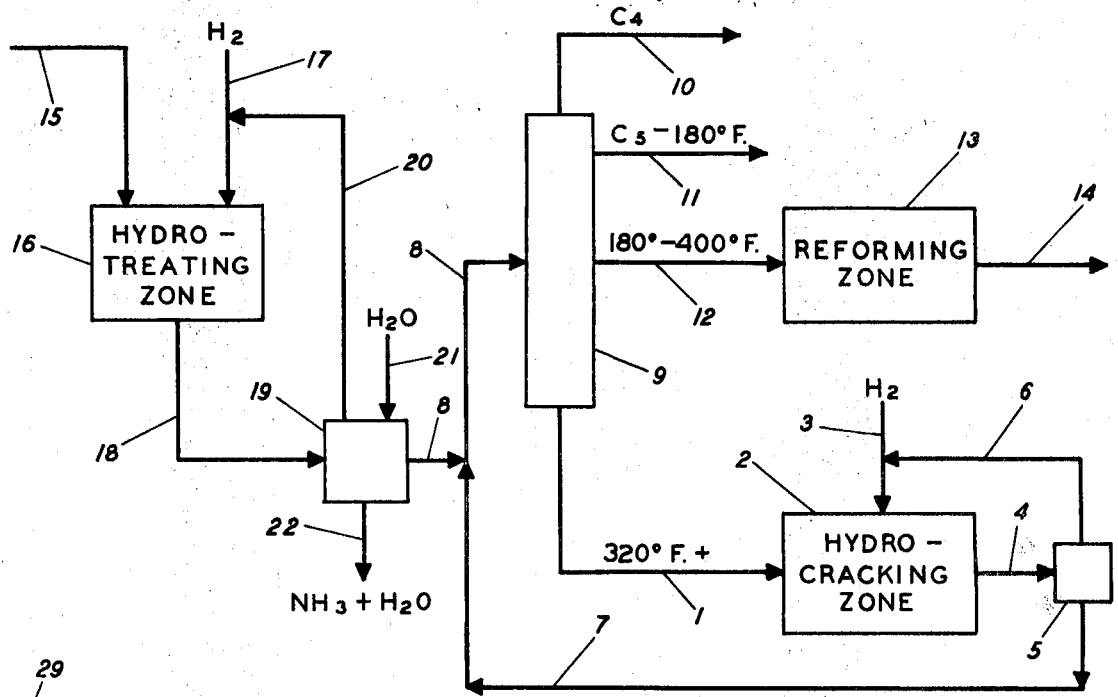

This invention relates to catalytic hydrocracking of petroleum distillates and solvent-deasphalted residua to produce high-value fuel products, including gasoline.

PRIOR ART

It is well known that a wide variety of crystalline zeolitic molecular sieves may be used as the cracking component of hydrocracking catalysts. It is also well known that the preferred, and most commonly used, hydrogenating components associated with these zeolitic cracking supports are platinum and palladium. Rabo et al. U.S. Pat. 3,236,761, for example, provides a particular type of decationized zeolitic molecular sieve catalyst, which may be used in some reactions without added metals, and in some reactions with added metals. The various applicable reactions are isomerization, reforming, cracking, polymerization, alkylation, dealkylation, hydrogenation, dehydrogenation and hydrocracking. Gold is named as a metal with which are molecular sieve may be loaded, but it is not clear from the patent which reactions such as catalyst would be used to catalyze. No example of a gold-molecular sieve catalyst is given, and the hydrocracking portion of the disclosure indicates that the molecular sieve catalyst of the patent may be used for hydrocracking without added metals, but preferably with added platinum or palladium if a metal-loaded molecular sieve is to be used. Further, because of the great stress placed by the Rabo et al. patent on Group VIII metals in association with a molecular sieve cracking component, and particularly the Group VIII noble metals, and the absence of any interest in gold except a passing mention, there is no guide in the patent either as to the applicability of a gold-molecular sieve catalyst for the hydrocracking reaction in particular, or to the amount of gold such a catalyst should contain, or as to the hydrocracking results that might be expected. Further, gold-molecular sieve catalysts are relatively inactive for hydrocracking. Further, there is no suggestion in the patent that gold be contained in a catalyst in combination with platinum or palladium, and no suggestion or appreciation of any advantages which might result from such a combination.

It is also known in the art to use gold in association with a gel-type silica-alumina cracking components for the hydrocracking of hydrocarbon fractions. However, it is also known that such a catalyst, as well as its palladium-gold analog, has low hydrocracking activity. Further, a hydrocracking catalyst having a silica-alumina cracking component is extremely nitrogen-sensitive, and the hydrocarbon feed hydrocracked in the presence of such a catalyst must be pretreated to reduce the nitrogen content to a low level; more than minor amounts of nitrogen in the hydrocarbon feed have an intolerable poisoning effect on the acid sites of the cracking component of the catalyst, seriously diminishing cracking activity.

Palladium-exchanged zeolites are well known in the hydrocracking art, and their superiority to palladium-impregnated zeolites has been well documented. However, gold has not been widely used with zeolites due to: (1) rarity of gold compounds that are soluble in solutions which will not destroy the zeolite structure; (2) difficulty of ion exchange of auric chloride, which is water-soluble; and (3) poor hydrocracking activity of gold-impregnated zeolites. This is evidence of the unobviousness of the present invention, which provides a superior hydrocracking catalyst containing gold or a compound thereof and a hydrogenating component selected from the metals platinum, palladium, rhodium, ruthenium, iridium, and compounds of said metals.

It is also known that conventional catalysts having a crystalline zeolitic molecular sieve cracking component and a platium hydrogenating component are sulfur-sensitive, and that while they are more sensitive to organic sulfur compounds they also are sensitive to $H_2S$. In each case, the sulfur acts as a poison, particularly for the hydrogenation component, and reduces the hydrogenation activity of the catalyst, which in turn increases the fouling susceptibility of the catalyst.

OBJECTS

In view of the foregoing, objects of the present invention include providing a hydrocracking catalyst:

(1) Having a cracking component less sensitive to nitrogen poisoning than silica-alumina gel;

(2) Having a plurality of hydrogenating components, each at least as insensitive to sulfur poisoning as platinum;

(3) Having at least as high a hydrocracking activity with economically low levels of the hydrogenating components as could be obtained with equal levels of palladium;

(4) Having a stability superior to palladium with said low levels of hydrogenating components;

(5) Which produces less gaseous by-products than hydrocracking catalysts of the prior art.

It is a further object of the present invention to provide various embodiments of a hydrocracking process using a catalyst having the aforesaid characteristics, including methods of further improving catalyst stability, and methods of operating the hydrocracking process in an integrated manner with other process units to achieve various advantageous results.

The present invention will best be understood, and further objects and advantages thereof will be apparent, from the following description when read in connection with the accompanying drawing.

DRAWING

Figure 2:
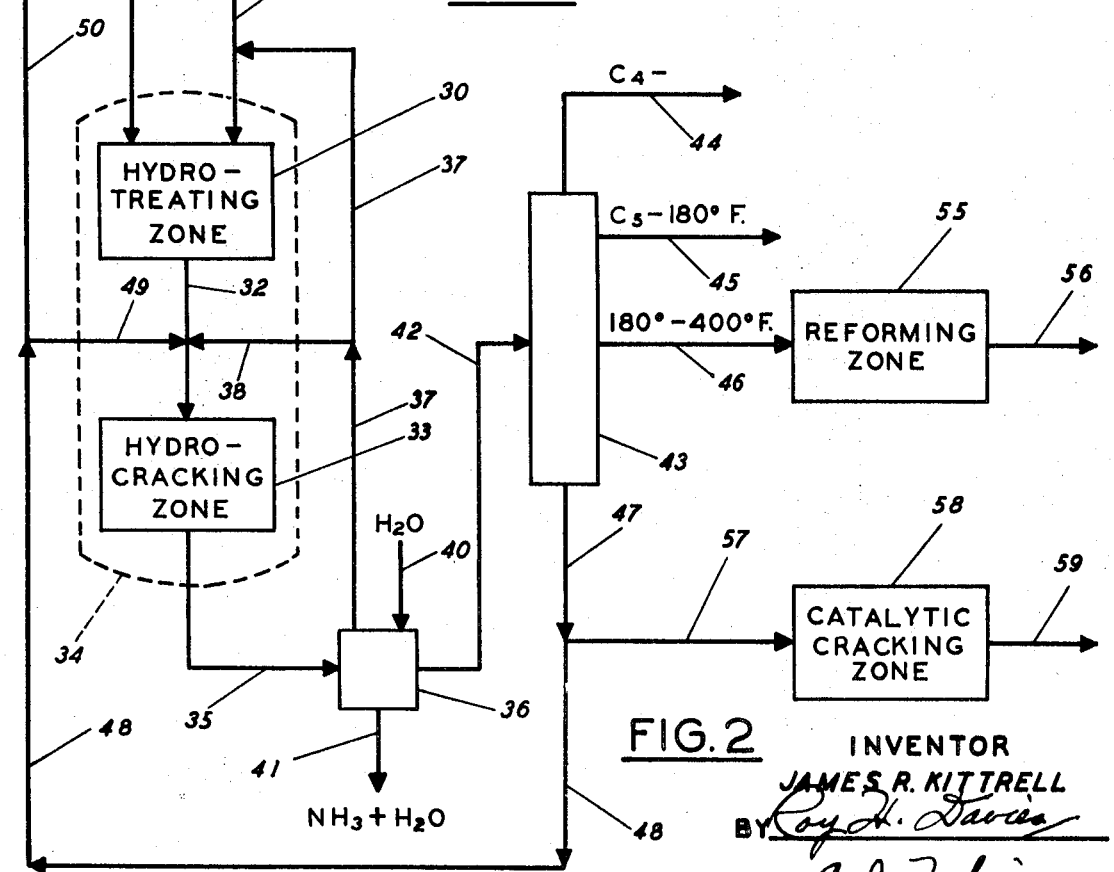

In the drawing, FIG. 1 is a diagrammatic illustration of apparatus and flow paths suitable for carrying out the process of several of the embodiments of the present invention, including embodiments wherein a hydrofining zone precedes the hydrocracking zone, and embodiments wherein a selected fraction from the hydrocracking zone is catalytically reformed;

FIG. 2 is a diagrammatic illustration of apparatus and flow paths suitable for carrying out the process of additional embodiments of the present invention, including embodiments wherein a hydrofining zone precedes a hydrocracking zone in a single reactor shell, and embodiments wherein a selected fraction from the hydrocracking zone is catalytically cracked.

STATEMENT OF INVENTION

It has been found that a hydrocracking catalyst comprising a crystalline zeolitic molecular sieve cracking component, a hydrogenating component selected from the metals platinum, palladium, rhodium, ruthenium, iridium, and compounds of said metals, in an amount of 0.01 to 2.0 weight percent, calculated as the metal and based on said cracking component, and a gold or gold-compound hydrogenating component in an amount of 0.01 to 5.0 weight percent, calculated as the metal and based on said cracking component, has all of the desirable catalyst attributes listed under Objects above and, therefore, in accordance with the present invention there is provided such a catalyst and processes using such a catalyst. Although Rabo et al. U.S. Pat. 3,236,761 discloses that a catalyst containing a crystalline zeolitic molecular sieve component also may contain gold, it is not clear from that patent that a catalyst containing gold and a crystalline zeolitic molecular sieve component has application as a hydrocracking catalyst, or what gold levels such as a catalyst should contain. For hydrocracking, Rabo et al. primarily are concerned with a catalyst comprising platinum or palladium on a crystalline zeolitic molecualr sieve. It has been found that the catalyst used in the process of the present invention surprisingly provides advantages over the Rabo et al. platinum or palladium on molecular sieve hydrocracking catalyst. In particular: (1) the presence of the gold component results in a catalyst of higher stability than a catalyst that is identical, except that contains no gold; and (2) the presence of the Group VIII component results in a catalyst of higher activity than a catalyst that is identical except that contains no Group VIII component.

In accordance with the present invention, therefore, there is provided a hydrocracking catalyst comprising a crystalline zeolitic molecular sieve cracking component, 0.01 to 2.0 weight percent, based on said cracking component and calculated as the metal, of a hydrogenating component selected from the metals platinum, palladium, rhodium, ruthenium, iridium, and compounds of said metals, and 0.01 to 5.0 weight percent, based on said cracking component and calculated as the metal, of a hydrogenating component selected from gold and compounds of gold.

Further in accordance with the present invention, there is provided a hydrocracking process which comprises contacting a hydrocarbon feedstock containing substantial amounts of materials boiling above 200° F. and selected from the group consisting of petroleum distillates, solvent-deasphalted petroleum residua, shale oils and coal tar distillates, in a reaction zone with hydrogen and the aforesaid catalyst of the present invention, at hydrocracking conditions including a temperature in the range 400° to 950° F., a pressure in the range 800 to 3500 p.s.i.g., a liquid hourly space velocity in the range 0.1 to 5.0, and a total hydrogen supply rate of 200 to 20,000 s.f.c. of hydrogen per barrel of said feedstock, and recovering from said reaction zone valuable products, including gasoline.

The crystalline zeolitic molecular sieve component of the catalyst of the present invention may be an ultra-stable molecuar sieve as discussed hereinafter.

Said catalyst further may additionally comprise a component selected from the group consisting of alumina and silica-alumina and a hydrogenating component selected from the group consisting of Group VI metals and compounds thereof and nickel and compounds thereof. When said catalyst comprises said additional components, preferably the catalyst is prepared by coprecipitation of all non-molecular sieve components to form a slurry, followed by addition of the molecular sieve component to the slurry in particulate form, followed by filtering, washing and drying to produce a hydrogel matrix having the molecular sieve component dispersed therethrough. Preferably the finished catalyst will have substantially all of the Group VI metals or nickel located in the matrix, and the molecular sieve component will be in the ammonia or hydrogen form, and will contain substantially all of the hydrogenating metals, for example, palladium and gold, that are required in the catalyst of the present invention. This result will be obtained if the molecular sieve component, loaded with the hydrogenating metals required in the catalyst of the present invention, is added to the slurry of other catalyst components at a pH of 5 or above. Alternatively, a molecular sieve component substantially in the hydrogen or ammonia form and substantially free of all catalytic loading metals (containing less than 0.2 weight percent of catalytic metal or metals) may be contained in the finished catalyst. This result will be obtained if the molecular sieve, in the ammonia, hydrogen or sodium form, is added to the slurry of other catalytic components, including the hydrogenating metals required in the catalyst of the present invention, at a pH of 5 or above.

The hydrocarbon feedstock preferably contains less than 1000 p.p.m. organic nitrogen. A prior hydrofining step may be used, if desired, to reduce the feed nitrogen content to the preferred level; however, because of the superior nitrogen tolerance of the molecular sieve component, compared with silica-alumina, the hydrofining steep need not accomplish complete nitrogen content reduction, as further discussed hereinafter.

Further in accordance with the present invention, advantageous results are obtained by providing in the reaction zone, in addition to said catalyst, a separate second catalyst comprising a hydrogenating component selected from Group VI metals and compounds thereof, a hydrogenating component selected from Group VIII metals and compounds thereof, and a component selected from the group consisting of alumina and silica-alumina. Further in accordance with the present invention, said separate second catalyst may be located in said reaction zone in a bed disposed above said catalyst comprising a zeolitic molecular sieve cracking component. In the embodiments of the present invention discussed in this paragraph, no other prior hydrofining step generally will be necessary, because hydrofining is accomplished in one reaction zone concurrently with hydrocracking, together with some hydrogenation of aromatics.

Still further in accordance with the present invention, there is provided a hydrocracking process which comprises sequentially contacting a hydrocarbon feedstock and hydrogen with a first bed of catalyst and then with a second bed of catalyst, said catalyst beds both being located within a single elongated reactor pressure shell, said first bed of catalyst being located in an upper portion of said shell, the catalyst of said first bed comprising a hydrogenating component selected from the group consisting of Group VI metals and compounds thereof and Group VIII metals and compounds thereof, and a component selected from the group consisting of alumina and silica-alumina, the catalyst of said second bed being the aforesaid catalyst of the present invention, maintaining said first bed of catalyst and said second bed of catalyst at a temperature in the range 400° to 950° F. and a pressure in the range 800 to 3500 p.s.i.g. during said contacting, maintaining the total supply rate of said hydrogen into said reactor shell from 200 to 20,000 s.c.f. of hydrogen per barrel of said feedstock, and recovering a gasoline product from the effluent of said second bed of catalyst.

The hydrocracking zone of the process of the present invention may be operated once through, or advantageously may be operated by recycling thereto materials from the effluent thereof that boil above 200° F., preferably above 400° F. All or a portion of these heavier materials advantageously may be catalytically cracked. The heavy gasoline fraction from the hydrocracking zone advantageously may be catalytically reformed.

HYDROCARBON FEEDSTOCKS

The feedstocks supplied to the hydrocracking zone containing the catalyst of the present invention in the process of the present invention are selected from the group consisting of petroleum distillates, solvent-deasphalted petroleum residua, shale oils and coal tar distillates. The feedstocks contain substantial amounts of materials boiling above 200° F., preferably substantial amounts of materials boiling in the range 350° to 950° F., and more preferably in the range 400° to 900° F. Suitable feedstocks include those heavy distillates normally defined as heavy straight-run gas oils and heavy cracked cycle oils, as well as conventional FCC feed and portions thereof. Cracked stocks may be obtained from thermal or catalytic cracking of various stocks, including those obtained from petroleum, gilsonite, shale and coal tar. As discussed hereinafter, the feedstocks may have been subjected to a hydrofining and/or hydrogenation treatment, which may have been accompanied by some hydrocracking, before being supplied to the hydrocracking zone containing the catalyst of the present invention.

NITROGEN CONTENT OF FEEDSTOCKS

While the process of the present invention can be practiced with utility when supplying to the hydrocracking zone containing the catalyst of the present invention, hydrocarbon feeds containing relatively large quantities of organic nitrogen, for example several thousand parts per million organic nitrogen, it is preferred that the organic nitrogen content be less than 1000 parts per million organic nitrogen. A preferred range is 0.5 to 1000 parts per million; more preferably, 0.5 to 100 parts per million. As previously discussed, a prior hydrofining step may be used, if desired, to reduce the feed nitrogen content to the preferred level. The prior hydrofining step advantageously may also accomplish hydrogenation and a reasonable amount of hydrocracking. Because of the superior tolerance of the molecular sieve component for organic nitrogen compounds, compared with silica-alumina, the hydrofining step need not accomplish complete organic nitrogen content reduction. Further, because of the superior tolerance of the molecular sieve component for ammonia, compared with silica-alumina, and because the molecular sieve component is more tolerant of ammonia than of organic nitrogen compounds, ammonia produced in the hydrofining zone either may be removed from the system between the hydrofining zone and the hydrocracking zone containing the hydrocracking catalyst of the present invention, or may be permitted to pass into the hydrocracking zone along with the feed thereto.

SULFUR CONTENT OF FEEDSTOCK

While the process of the present invention can be practiced with utility when supplying to the hydrocracking zone, containing the catalyst of the present invention, hydrocarbon feeds containing relatively large quantities of organic sulfur, it is preferable to maintain the organic sulfur content of the feed to that zone in a range of 0 to 3 weight percent, preferably 0 to 1 weight percent.

CATALYST COMPRISING A CRYSTALLINE ZEOLITIC MOLECULAR SIEVE CRACKING COMPONENT, A GOLD OR GOLD-COMPOUND HYDROGENATING COMPONENT, AND A HYDROGENATING COMPONENT SELECTED FROM THE METALS PLATINUM, PALLADIUM, RHODIUM, RUTHENIUM, IRIDIUM, AND COMPOUNDS OF SAID METALS.

(A) General

The crystalline zeolitic molecular sieve cracking component of the hydrocracking catalyst of the present invention may be of any type that is known in the art as a useful component of a conventional hydrocracking catalyst comprising a noble metal or noble metal-compound hydrogenating component. A decationized molecular sieve cracking component is preferred. Especially suitable are faujasite, particularly "Y" type and "X" type faujasite, and mordenite, in the ammonia form, hydrogen form, alkaline earth-exchanged form, or rare earth-exchanged form.

An ultra-stable form of crystalline zeolitic molecular sieve is especially preferred, that is, one having a sodium content below about 3 weight percent, calculated as $Na_2O$, a unit cell size below 24.65 angstroms, and a silica/alumina weight ratio above about 2.15.

The gold hydrogenating component of the catalyst may be present in the final catalyst in the form of the metal, metal oxide, metal sulfide, or a combination thereof. The gold or compound thereof may be combined with the molecular sieve cracking component, or may be combined with other catalyst components in which the molecular sieve cracking component is dispersed, or both. In any case, the gold will be present in an amount of 0.01 to 5.0 weight percent, based on the molecular sieve cracking component and calculated as the metal.

The hydrogenating component of the catalyst that is selected from the metals platinum, palladium, rhodium, ruthenium, iridium, and compounds of said metals, may be present in the final catalyst in the form of the metal, metal oxide, metal sulfide, or a combination thereof. This component may be combined with the molecular sieve cracking component, or may be combined with other catalyst components in which the molecular sieve cracking component is dispersed, or both. In any case, the component will be present in an amount of 0.01 to 2.0 weight percent, based on the molecular sieve cracking component and calculated as the metal.

A preferred catalyst comprises a molecular sieve cracking component intimately dispersed in a matrix of other catalytic components comprising alumina or silica-alumina. The gold or compound thereof, and the component selected from the metals platinum, palladium, rhodium, ruthenium, iridium, and compounds of said metals may be combined with the molecular sieve cracking component before the latter is dispersed in the matrix, or the gold or compound thereof and the component selected from the metals platinum, palladium, rhodium, ruthenium, iridium, and compounds of said metals may be a portion of the matrix. Examples of particularly suitable matrices, in addition to matrices consisting of alumina or silica-alumina, include matrices comprising: (a) palladium or a compound thereof and gold or a compound thereof and silica-alumina; (b) palladium or a compound thereof and gold or a compound thereof and alumina; (c) iridium or a compound thereof and gold or a compound thereof and alumina; (d) iridium or a compound thereof and gold or a compound thereof and silica-alumina; (e) platinum or a compound thereof and gold or a compound thereof and alumina; (f) platinum or a compound thereof and gold or a compound thereof and silica-alumina; (g) any of the foregoing with the addition of nickel or a compound thereof; if desired, the nickel or compound thereof may be accompanied by a Group VI metal or compound thereof.

The molecular sieve cracking component, when present in a matrix of other catalytic components, or when present as a physical mixture with other separate catalyst components, preferably is present in an amount of 1 to 50 weight percent based on the total weight of all of the catalyst components.

(B) Method of preparation

The molecular sieve cracking component of the catalyst may be prepared by any conventional method known in the art.

In the case wherein gold or a compound thereof and a component selected from the metals platinum, palladium, rhodium, ruthenium, iridium, and compounds of said metals are added directly to the molecular sieve cracking component, impregnation using aqueous solutions of suitable hydrogenating metal compounds or adsorption of suitable hydrogenating metal compounds are operable methods of incorporating the hydrogenating components or compounds thereof into the molecular sieve. Ion exchange methods whereby the hydrogenating components are incorporated into the molecular sieve by exchanging those components with a metal component already present in the molecular sieve may be used. However, such methods require use of compounds wherein the metals to be introduced into the molecular sieve are present as cations.

In the case wherein the molecular sieve cracking component first is dispersed in a matrix of other catalytic components and gold or a compound thereof and a component selected from the metals platinum, palladium, rhodium, ruthenium, iridium, and compounds of said metals are introduced into the resulting composition, impregnation using an aqueous solution of suitable hydrogenating component compounds or adsorption of suitable hydrogenating component compounds are the preferred methods.

It is highly preferred that the gold compound used in the impregnation or adsorption step be auric chloride. Most other gold compounds are soluble only in solutions which destroy the crystallinity of the molecular sieve.

The platinum, palladium, rhodium, ruthenium or iridium compound used in preparing the catalyst may be any convenient compound, for example platinum, palladium or iridium chloride, tetra ammino palladium nitrate, etc.

Where the molecular sieve component, with or without added hydrogenating components, is dispersed in a matrix of other catalyst components, the dispersion may be accomplished by cogelation of said other components around said molecular sieve component in a conventional manner.

Following combination of the catalyst components, the resulting composition may be washed free of impurities and dried at a temperature in the range 500° to 1100° F. for a reasonable time, for example 2 to 48 hours. Particularly when the catalyst comprises an ultrastable crystalline zeolitic molecular sieve component, it may be subjected, following drying, to a high-temperature thermactivation, at 1200° to 1600° F. for 0.25 to 48 hours, in an oxygen-containing gas stream, which may be air, and which preferably is as dry as practicable.

The finished catalyst may be sulfided in a conventional manner prior to use, if desired. If not presulfided, the catalyst will tend to become sulfided during process operation from any sulfur compounds that may be present in the hydrocarbon feed. As discussed elsewhere herein, the equilibrium degree of sulfiding at a given operating temperature will be different than in a corresponding catalytic system wherein a noble metal component alone is present, with no gold being present.

SEPARATE HYDROFINING CATALYST

(A) General

As previously indicated, advantageous results are obtained by providing in the reaction zone containing the hydrocracking catalyst of the present invention a separate second catalyst comprising a hydrogenating component selected from Group VI metals and compounds thereof, a hydrogenating component selected from Group VIII metals and compounds thereof, and a support selected from the group consisting of alumina and silica-alumina. Pellets or other particles of this separate second catalyst may be physically mixed with said hydrocracking catalyst, but preferably are disposed in a separate catalyst bed located ahead of said hydrocracking catalyst in the same reactor shell, eliminating interstage condensation, pressure letdown and ammonia and hydrogen sulfide removal. In a preferred arrangement using downflow of hydrocarbon feed, the bed of separate second catalyst is located above said hydrocracking catalyst in the same reactor shell.

Where said separate second catalyst is located in the same reactor shell as the hydrocracking catalyst of the present invention, it is preferably present in an amount in the range of 10 to 40 volume percent of the total amount of catalyst in the reactor.

In an arrangement less preferred than the ones discussed above in this section, the separate second catalyst may be located in a separate hydrofining reactor, operated under conventional hydrofining conditions, from the effluent of which ammonia or hydrogen sulfide, or both, and also hydrocarbon products, if desired, may be removed prior to hydrocracking the remaining hydrofined feedstock in a subsequent hydrocracking reactor in the presence of the catalyst of the present invention.

In any of the arrangements discussed in this section, the separate second catalyst preferably has hydrofining activity and hydrogenation activity, and even more preferably also has enough hydrocracking activity to convert 0.2 to 50, preferably 5 to 20, weight percent of the hydrocarbon feedstock to products boiling below the initial boiling point of the feedstock in a single pass. The hydrogenation activity preferably is sufficient to saturate or partially saturate a substantial portion of the organic oxygen, nitrogen and sulfur compounds in the feed to water, ammonia and hydrogen sulfide.

Preferably, said separate second catalyst contains nickel or cobalt or compounds thereof in an amount of 1 to 15 weight percent, calculated as metal, and molybdenum or tungsten or compounds thereof, in an amount of 5 to 30 weight percent, calculated as metal, with the remainder of the catalyst consisting of alumina, or silica-alumina containing up to 50 weight percent silica.

Particularly preferred examples of said separate second catalyst, comprising silica-alumina, are:

| Percent by weight of total catalyst, calculated as metal | | | $SiO_2/Al_2O_3$ weight ratio |
|---|---|---|---|
| Ni | Mo | W | |
| 1.... 4–10 | 15–25 | | 10/90 to 30/70. |
| 2.... 6–15 | | 15–39 | 30/70 to 50/50. |

(B) Method of preparation

Said separate second catalyst may be prepared by any conventional preparation method, including impregnation of an alumina or silica-alumina support with salts of the desired hydrogenating component, or cogelation of all components, with the latter method being preferred.

As previously pointed out, the hydrocracking catalyst of the present invention has activity and stability advantages over certain conventional hydrocracking catalysts. It has been found that use of said separate second catalyst in the above-described arrangements further increases the stability of the hydrocracking catalyst of the present invention, compared with the stability of the latter catalyst when the identical feed thereto has not been first or concurrently processed in the presence of said separate second catalyst.

OPERATING CONDITIONS

The hydrocracking zone containing the catalyst of the present invention is operated at hydrocracking conditions including a temperature in the range 400° to 950° F., preferably 500° to 850° F., a pressure in the range 800 to 3500 p.s.i.g., preferably 1000 to 3000 p.s.i.g., a liquid hourly space velocity in the range 0.1 to 5.0, preferably 0.5 to 5.0, and more preferably 0.5 to 3.0. The total hydrogen supply rate (makeup and recycle hydrogen)

to said zone is 200 to 20,000 s.c.f., preferably 2000 to 20,000 s.c.f., of hydrogen per barrel of said feedstock.

Where a separate hydrofining zone, which also may accomplish hydrogenation and some hydrocracking, is located ahead of the hydrocracking zone containing the catalyst of the present invention, the operating conditions in the separate hydrofining zone include a temperature of 400° to 900° F., preferably 500° to 800° F., a pressure of 800 to 3500 p.s.i.g., preferably 1000 to 2500 p.s.i.g., and a liquid hourly space velocity of 0.1 to 5.0, preferably 0.5 to 3.0. The total hydrogen supply rate (makeup and recycle hydrogen) in 200 to 20,000 s.c.f. of hydrogen per barrel of feedstock, preferably 2000 to 20,000 s.c.f. of hydrogen per barrel of feedstock.

Where a separate bed of hydrofining catalyst is located above a bed of the hydrocracking catalyst of the present invention in the same reactor shell, the space velocity through the bed of hydrofining catalyst will be a function of the space velocity through the hydrocracking catalyst bed and the amount of hydrofining catalyst expressed as a volume percent of the total catalyst in the reactor. For example, where the hydrofining catalyst is 25 volume percent of the total catalyst in the reactor, and the space velocity through the bed of hydrocracking catalyst is 0.9, the space velocity through the bed of hydrofining catalyst will be 2.7. Accordingly, the space velocity through the bed of hydrofining catalyst in the process of the present invention may range from 0.15 to 45.0.

The operating conditions in the reforming zone and catalytic cracking zone employed in various embodiments of the present invention are conventional conditions known in the art.

PROCESS OPERATION WITH REFERENCE TO DRAWING

Referring now to FIG. 1 of the drawing, in accordance with a primary embodiment of the present invention, a hydrocarbon feedstock as previously described, which in this case may boil above 400° F., is passed through line 1 into hydrocracking zone 2, which contains a hydrocracking catalyst comprising a crystalline zeolitic molecular sieve cracking component, 0.01 to 2.0 weight percent, based on said cracking component, of platinum, palladium, rhodium, ruthenium or iridium, and 0.01 to 5.0 weight percent, based on said cracking component, of gold. As previously discussed, the molecular sieve component may be dispersed in a matrix of other catalyst components, which matrix may contain all or a portion of the hydrogenating components. Also as previously discussed, a separate second catalyst, previously described, may be located in hydrocracking zone 2. The feedstock is hydrocracked in hydrocracking zone 2 at conditions previously discussed, in the presence of hydrogen supplied through line 3. From hydrocracking zone 2 an effluent is withdrawn through line 4, hydrogen is separated therefrom in separator 5, and hydrogen is recycled to hydrocracking zone 2 through line 6. From separator 5, hydrocracked materials are passed through lines 7 and 8 to distillation column 9, where they are separated into fractions, including a $C_4^-$ fraction which is withdrawn through line 10, a $C_5$–180° F. fraction which is withdrawn through line 11, and a 180°–400° F. fraction which is withdrawn through line 12.

Still referring to FIG. 1, in accordance with another embodiment of the present invention, the 180°–400° F. fraction in line 12 is reformed under conventional catalytic reforming conditions in reforming zone 13, from which a catalytic reformate is withdrawn through line 14.

Still referring to FIG. 1, in accordance with another embodiment of the present invention, a hydrocarbon feedstock which is to be hydrofined and/or hydrogenated, and partially hydrocracked, if desired, in a separate hydrotreating zone prior to being hydrocracked in hydrocracking zone 2, is passed through line 15 to hydrotreating zone 16 containing a catalyst, as previously described, having hydrofining and/or hydrogenation activity. The feedstock is hydrotreated in zone 16 at conditions previously described, in the presence of hydrogen supplied through line 17. The effluent from hydrotreating zone 16 is passed through line 18 to separation zone 19, from which hydrogen separated from the treated feedstock is recycled through line 20 to hydrotreating zone 16. In zone 19, water entering through line 21 is used to scrub ammonia and other contaminants from the incoming hydrocarbon stream, and the ammonia, water and other contaminants are withdrawn from zone 19 through line 22. The scrubbed feedstock is passed through line 8 to distillation column 9 and thence to hydrocracking zone 2.

Referring now to FIG. 2, a hydrocarbon feedstock, as previously described, which in this case may boil above 400° F., is passed through line 29 to hydrotreating zone 30 containing a catalyst, as previously described, having hydrofining and/or hydrogenation activity. The feedstock is hydrofined and/or hydrogenated, and partially hydrocracked, if desired, in zone 30, at conditions previously described, in the presence of hydrogen supplied through line 31. The effluent from zone 30 is passed through line 32, without intervening impurity removal, into hydrocracking zone 33, where it is hydrocracked in the presence of a hydrocracking catalyst comprising a crystalline zeolitic molecular sieve cracking component and 0.01 to 2.0 weight percent, based on said cracking component, of platinum, palladium, rhodium, ruthenium or iridium, and 0.01 to 5.0 weight percent, based on said cracking component, of gold. Said catalyst may contain other catalytic components, and a separate second catalyst may be present in zone 33, as described in connection with zone 2 in FIG. 1. Hydrotreating zone 30 and hydrocracking zone 33 may be located in separate reactor shells, which may be operated at different pressures. Alternatively, and in a preferred manner of operation, hydrotreating zone 30 and hydrocracking zone 33 may be separate catalyst beds located in a single pressure shell 34, and the effluent from zone 30 may be passed to zone 33 without intervening pressure letdown, condensation or impurity removal. The effluent from zone 33 is passed through line 35 to separation zone 36, from which hydrogen is recycled through line 37 to hydrotreating zone 30. All or a portion of the recycled hydrogen may be passed through line 38 to hydrocracking zone 33, if desired. In separation zone 36, water entering through line 40 is used to scrub ammonia and other contaminants from the incoming hydrocarbon stream, and the ammonia, water and other contaminants are withdrawn from zone 36 through line 41. The effluent from zone 36 is passed through line 42 to distillation column 43, where it is separated into fractions, including a $C_4^-$ fraction which is withdrawn through line 44, a $C_5$–180° F. fraction which is withdrawn through line 45, a 180°–400° F. fraction which is withdrawn through line 46, and a fraction boiling above 400° F. which is withdrawn through line 47. The fraction in line 47 may be recycled through lines 48 and 49 to hydrocracking zone 33. All or a portion of the fraction in line 48 may be recycled to hydrotreating zone 30 through line 50, if desired.

Still referring to FIG. 2, in accordance with another embodiment of the present invention, the 180°–400° F. fraction in line 46 may be passed to a catalytic reforming zone 55, where it may be reformed in the presence of a conventional catalytic reforming catalyst under conventional catalytic reforming conditions to produce a catalytic reformate, which is withdrawn from zone 55 through line 56.

Still referring to FIG. 2, in another embodiment of the present invention, all or a portion of the fraction in line 47 may be passed through line 57 to catalytic cracking zone 58, which may contain a conventional catalytic cracking catalyst and which may be operated under conventional catalytic cracking conditions, and from which a catalytically cracked effluent may be withdrawn through line 59.

EXAMPLES

The following examples are given for the purpose of further illustrating the practice of the process of the present invention. However, it is to be understood that these examples are not intended in any way to limit the scope of the present invention.

Example 1

A gold-iridium-crystalline zeolitic molecular sieve catalyst (Catalyst A), in accordance with the present invention, is prepared in the following manner.

These starting materials are used:

(1) 500 grams of Linde ammonium "Y" crystalline zeolitic molecular sieve, containing 52.0 weight percent volatiles, primary $H_2O$ and $NH_3$.

(2) 153 cc. of an aqueous solution of auric chloride ($AuCl_3 \cdot 2H_2O$) and chloroiridic acid ($H_2IrCl_6 \cdot H_2O$), said solution containing 3.9 grams of gold and 0.313 gram of iridium.

The molecular sieve, in lumpy powder form, is introduced into a Hobart kitchen blender, with slow addition of the acid solution while stirring, to form a pasty mass. The pasty mass is transferred to a dish and is dried at 120° F. for approximately 16 hours. The resulting dried material is pressed through a 40-mesh screen to obtain fine granules. The granules are blended with a 1% Sterotex lubricant binder, and tabletted. The tablets are calcined in flowing air for 5 hours at 950° F. The tabletted, calcined material is crushed, and a resulting 8–16 mesh fraction thereof is separated for use as a catalyst in the process of the present invention.

Example 2

A gold-palladium-crystalline zeolitic molecular sieve catalyst (Catalyst B), in accordance with the present invention, is prepared by the method of Example 1, except that the molecular sieve is loaded with 0.5 weight percent palladium by ion exchange, using tetra ammino palladium nitrate, followed by addition to the molecular sieve of 0.5 weight percent gold. The gold is added by impregnation, as in Example 1.

Example 3

A gold-platinum-crystalline zeolitic molecular sieve catalyst (Catalyst C), in accordance with the present invention, is prepared by the method of Example 1, except that the molecular sieve is loaded with 0.5 weight percent platinum by ion exchange, using tetra ammino platinum nitrate, followed by addition to the molecular sieve of 0.5 weight percent gold. The gold is added by impregnation, as in Example 1.

Example 4

A gold-crystalline zeolitic molecular sieve catalyst (Catalyst D, a comparison catalyst) is prepared in the following manner.

These starting materials are used:

(1) 500 grams of a Linde ammonium "Y" crystalline zeolitic molecular sieve, containing 27.6 weight percent volatiles, primarily $H_2O$ and $NH_3$.

(2) 300 cc. of an aqueous solution of auric chloride ($AuCl_3 \cdot 2H_2O$), containing 5.2 grams of gold.

The molecular sieve, in lump powder form, is introduced into a Hobart kitchen blender, with slow addition of the gold chloride solution while stirring, to form a pasty mass. The pasty mass is transferred to a dish and is dried at 120° F. for approximately 16 hours. The resulting dried material is pressed through a 40-mesh screen to obtain fine granules. The granules are blended with a 1% Sterotex lubricant binder, and tabletted. The tablets are calcined in flowing air for 5 hours at 950° F. The tabletted, calcined gold-molecular sieve material is crushed, and a resulting 8–16 mesh fraction thereof is separated for use as a catalyst.

Example 5

A palladium-crystalline zeolitic molecular sieve catalyst (Catalyst E, a comparison catalyst), containing 0.5 weight percent palladium, was prepared by ion exchange, using tetra ammino palladium nitrate and an ammonium "Y" crystalline zeolitic molecular sieve.

Example 6

(A) Comparison Catalyst D of Example 4 is used to hydrocrack a portion of a light cycle oil hydrocarbon feedstock of the following description:

| | |
|---|---|
| Gravity | ° API__ 19.5 |
| Aniline point | ° F__ 62 |
| Sulfur content | wt. percent__ 0.43 |
| Nitrogen content | p.p.m.__ 330 |
| Aromatics content | liquid volume percent__ 70 |

Boiling range, ASTM D–1160 distillation:

ST/5—381/471
10/30—492/532
50—568
70/90—598/635
95/EP—648/681

The hydrocracking is accomplished, on a recycle liquid basis, at a pressure of 2100 p.s.i.g., a liquid hourly space velocity of 0.9, and a hydrogen supply rate of 12,000 s.c.f. per barrel of hydrocarbon feedstock, and at a per-pass conversion of 80 volume percent of the feed to products boiling below 400° F. The hydrogen consumption is 2000 s.c.f. per barrel of hydrocarbon feedstock. The hydrocracking is accomplished in a reactor containing a bed of Catalyst D, located below a bed of conventional hydrofining catalyst. The volumetric ratio of Catalyst D to conventional hydrofining catalyst is 4:1. The hydrocarbon feedstock enters the top of the reactor.

(B) The catalysts of Examples 2 and 5 (Catalysts B and E, respectively) are used to hydrocrack a portion of the same light cycle oil under the same process conditions, except for temperature.

The starting temperatures which are required to achieve said per-pass conversion of 80 volume percent of the feed to products boiling below 400° F. and the catalyst fouling rates, that is, the hourly rates of temperature increase which are required to maintain said 80 volume percent per-pass conversion, are as follows:

| | Catalyst | | |
|---|---|---|---|
| | B | D | E |
| | PdAu | Au | Pd |
| Starting temp., ° F. | 710 | >770 | 710 |
| Fouling rate, ° F./hour | 0.01 | >0.1 | 0.07 |

From the above-tabulated results, it may be seen that:

(a) Catalyst B of the present invention has a higher activity than comparison Catalyst D.

(b) Catalyst B of the present invention has a lower fouling rate than comparison catalyst E.

Example 7

Catalyst B of Example 2 (a catalyst of the present invention) is used to hydrocrack a portion of a light catalytic cycle oil feedstock of the following description:

| | |
|---|---|
| Gravity | ° API__ 30.1 |
| Aniline point | ° F__ 132 |
| Sulfur content | p.p.m.__ 5 |
| Nitrogen content | p.p.m.__ 0.3 |

ASTM D–1160 distillation:

ST/5—409/446
10/30—460/486
50—523
70/90—572/632
95/EP—673/732

The hydrocracking is accomplished, on a recycle liquid basis, at a pressure of 1200 p.s.i.g., a liquid hourly space velocity at 4.0, a per-pass conversion of 80 liquid volume percent below 400° C., and a hydrogen supply rate of approximately 7000 s.c.f./bbl. A commercial hydrocracking catalyst, a nickel-tin-silica-alumina cogel (Catalyst F, a comparison catalyst) is used to hydrocrack a portion of the same light catalytic cycle oil under the same process conditions, except for temperature. The following results are obtained:

| | Catalyst | |
|---|---|---|
| | B | F |
| Starting temperature, ° F | 570 | 590 |
| Fouling rate, ° F./hr | 0.02 | 0.08 |
| $C_5+$ liquid yield, wt. percent | 89.5 | 87.2 |

Catalyst B is seen to be superior to comparison Catalyst F, even at these low temperatures where catalysts having crystalline zeolitic molecular sieve supports usually do not compare favorably with catalysts having amorphous silica-alumina supports. (Compare these temperatures, for example, with the operating temperatures of Example 6).

CONCLUSIONS

Applicant does not intend to be bound by any theory for the unexpected superior activity and stability of the catalysts of the present invention. However, he assumes that the favorable results are largely attributable to: (1) a different, and more favorable, equilibrium at a given operating temperature for the system consisting of gold metal, the various gold oxides, the various gold sulfides, platinum, palladium, rhodium, ruthenium or iridium metal, the various oxides of platinum, palladium, rhodium, ruthenium or iridium, the various sulfides of platinum, palladium, rhodium, ruthenium or iridium, and sulfur and hydrogen, than for the system consisting of platinum metal, platinum oxide, platinum sulfide, sulfur and hydrogen, which provides a hydrocracking catalyst superior to the Rabo et al. noble-metal-containing catalyst; and (2) an interaction between the effect of gold or a gold compound and a molecular sieve cracking component that produces more favorable hydrocracking results than are produced by any interaction between the effect of gold or a gold compound and a gel-type silica-alumina cracking component.

It has been shown that the process of the present invention has advantages over conventional hydrocracking processes, particularly in that the hydrocracking catalyst comprising a crystalline zeolitic molecular sieve cracking component, a gold or gold compound hydrogenating component, and a hydrogenating component selected from the metals platinum, palladium, rhodium, ruthenium, iridium, and compounds of said metals, is nitrogen-tolerant and sulfur-tolerant, has a high stability, and has high cracking activity comparable with prior art catalysts.

What is claimed is:

1. A hydrocracking catalyst comprising a crystalline zeolitic molecular sieve cracking component, 0.01 to 2.0 weight percent, based on said cracking component and calculated as the metal, of a hydrogenating component selected from the metals platinum, palladium, rhodium, ruthenium, iridium, and compounds of said metals, and 0.01 to 5.0 weight percent, based on said cracking component and calculated as the metal, of a hydrogenating component selected from gold and compounds of gold.

2. A catalyst as in claim 1, wherein said crystalline zeolitic molecular sieve cracking component has a sodium content below about 3 weight percent, calculated as $Na_2O$, a unit cell size below 24.65 angstroms, and a silica/alumina weight ratio above about 2.15.

3. A catalyst as in claim 1, which further comprises a matrix containing a component selected from alumina gel and silica-alumina gel.

4. A catalyst as in claim 3, which further comprises at least one hydrogenating component selected from Group VI metals and compounds thereof and nickel and compounds thereof.

5. A catalyst as in claim 3, wherein said crystalline zeolitic molecular sieve cracking component is in particulate form, and is dispersed through said matrix.

6. A catalyst as in claim 5, wherein said crystalline zeolitic molecular sieve cracking component is substantially in the ammonia or hydrogen form and is substantially free of any catalytic metal or metals, and wherein said hydrogenating components are contained in said matrix.

7. A hydrocracking process which comprises contacting a hydrocarbon feedstock containing substantial amounts of materials boiling above 200° F. and selected from the group consisting of petroleum distillates, solvent-deasphalted petroleum residua, shale oils and coal tar distillates, in a reaction zone with hydrogen and the catalyst of claim 1, at hydrocracking conditions including a temperature in the range 400° to 950° F., a pressure in the range 800 to 3500 p.s.i.g., a liquid hourly space velocity in the range 0.1 to 5.0 and a total hydrogen supply rate of 200 to 20,000 s.c.f. of hydrogen per barrel of said feedstock, and recovering from said reaction zone valuable products, including gasoline.

8. A process as in claim 7, wherein said catalyst further comprises a component selected from the group consisting of alumina gel and silica-alumina gel.

9. A process as in claim 8, wherein said catalyst further comprises at least one hydrogenating component selected from the group consisting of Group VI metals and compounds thereof and nickel and compounds thereof.

10. A process as in claim 7, wherein said hydrocarbon feedstock contains 0.5 to 1000 p.p.m. organic nitrogen.

11. A process as in claim 7, wherein said reaction zone contains, in addition to said catalyst, a separate second catalyst comprising a hydrogenating component selected from Group VI metals and compounds thereof, a hydrogenating component selected from Group VIII metals and compounds thereof, and a component selected from the group consisting of alumina and silica-alumina, said separate second catalyst being located in said reaction zone in a bed disposed above said catalyst comprising a crystalline zeolitic molecular sieve cracking component, the liquid hourly space velocity through said separate second catalyst being 0.15 to 45.0.

12. A hydrocracking process which comprises sequentially contacting a hydrocarbon feedstock and hydrogen with a first bed of catalyst and then with a second bed of catalyst, said catalyst beds both being located within a single elongated reactor pressure shell, said first bed of catalyst being located in an upper portion of said shell, the catalyst of said first bed comprising a hydrogenating component selected from the group consisting of Group VI metals and compounds thereof and Group VIII metals and compounds thereof and a component selected from the group consisting of alumina and silica-alumina, the catalyst of said second bed being the catalyst of claim 1, maintaining said first bed of catalyst and said second bed of catalyst at a temperature in the range 400° to 950° F. and a pressure in the range 800 to 3500 p.s.i.g. during said contacting, maintaining the total supply rate of said hydrogen into said reactor shell from 200 to 20,000 s.c.f. of hydrogen per barrel of said feedstock, and recovering a gasoline product from the effluent of said second bed of catalyst.

13. A process as in claim 12, wherein the effluent from said second bed of catalyst is separated into fractions, including a light gasoline fraction, a heavy gasoline fraction, and a fraction boiling generally higher than said heavy gasoline fraction.

14. A process as in claim 13, wherein said heavy gasoline fraction is catalytically deformed under conventional catalytic reforming conditions.

15. A process as in claim 13, wherein said fraction boiling generally higher than said heavy gasoline fraction is catalytically cracked under conventional catalytic cracking conditions.

References Cited

UNITED STATES PATENTS

| | | | |
|---|---|---|---|
| 3,236,761 | 2/1966 | Rabo et al. | 208—111 |
| 3,471,412 | 10/1969 | Miale et al. | 252—439 |
| 3,507,812 | 4/1970 | Smith et al. | 252—455 |

DELBERT E. GANTZ, Primary Examiner

R. BRUSKIN, Assistant Examiner

U.S. Cl. X.R.

208—89, 111; 252—474, 476, 455; 208—61